Figure 1:
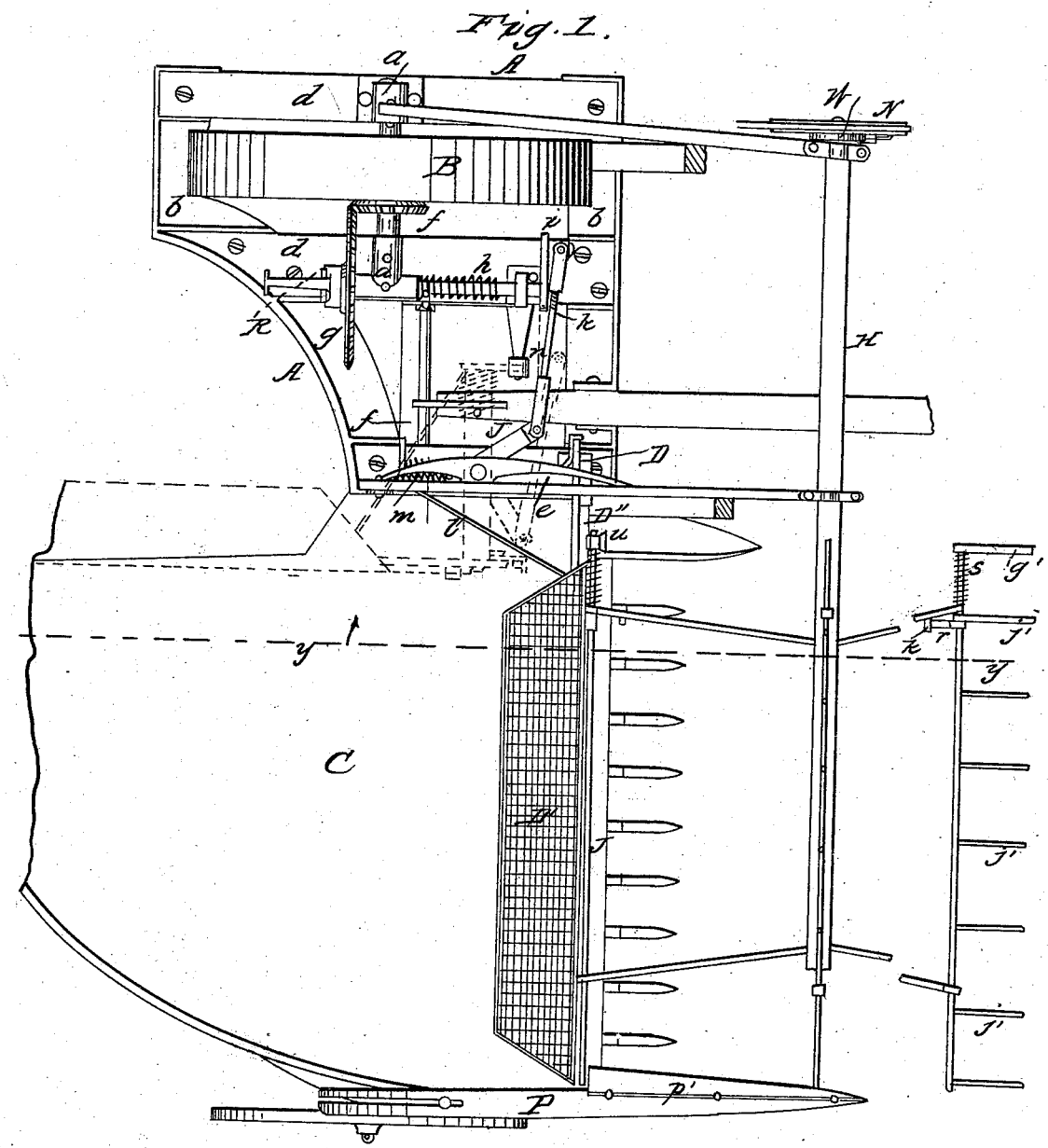

C. R. BRINCKERHOFF.
Harvester.

No. 98,737.

2 Sheets—Sheet 1.

Patented Jan'y 11, 1870.

Witnesses:
H. H. Clement
Wm. O. Loughborough

Inventor:
C. R. Brinckerhoff

C. R. BRINCKERHOFF.
Harvester.
No. 98,737.
2 Sheets—Sheet 2.
Patented Jan'y 11, 1870.
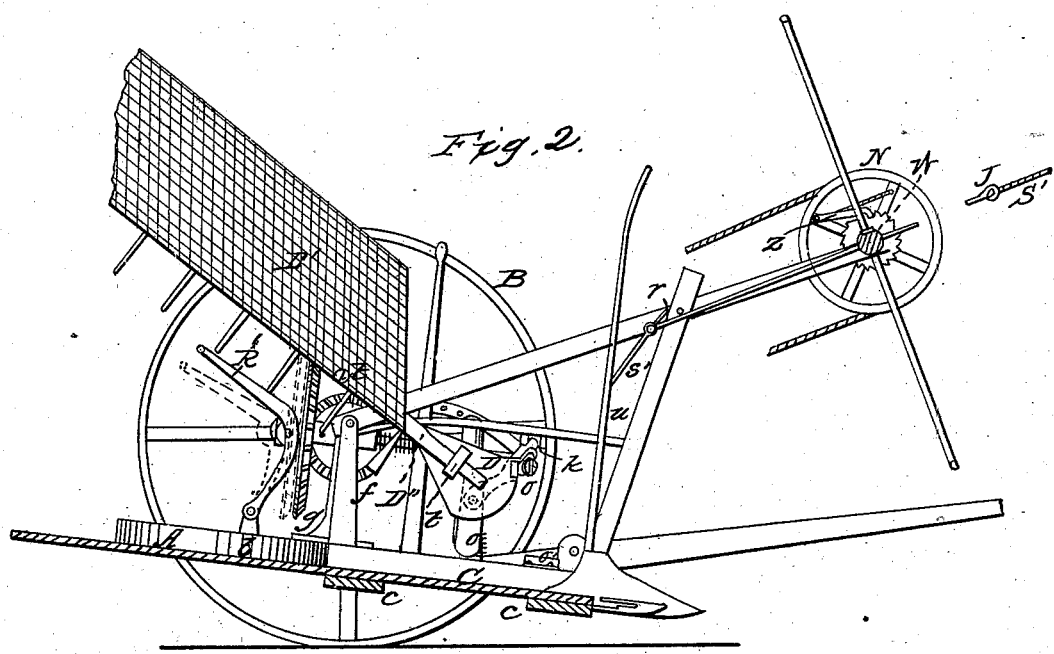
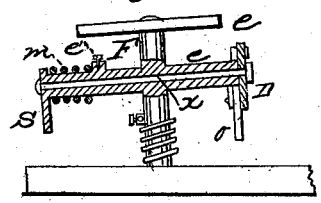
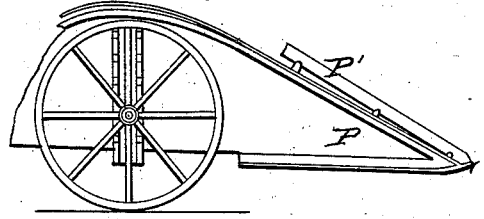

UNITED STATES PATENT OFFICE.

CORNELIUS R. BRINCKERHOFF, OF ROCHESTER, NEW YORK.

IMPROVEMENT IN HARVESTERS.

Specification forming part of Letters Patent No. 98,737, dated January 11, 1870.

*To all whom it may concern:*

Be it known that I, CORNELIUS R. BRINCKERHOFF, of Rochester, in the county of Monroe and State of New York, have invented certain new and useful Improvements in Harvesters; and I do hereby declare that the following is a full, clear, and exact description thereof, reference being had to the accompanying drawings, making part of this specification, in which—

Figure 1 is a plan view of a harvester with my improvements attached. Fig. 2 is a vertical section through the dotted line $y$ in Fig. 1, showing the main portions of the machine in elevation. Fig. 3 is an elevation of the outside divider. Fig. 4 is a sectional elevation of the sweep-post and attachments.

The object and nature of my improvements will be understood by reference to the specification and drawings.

To enable others to make and use my invention, I will describe its construction and operation.

The main frame A of my harvester is composed partly of iron and partly of wood, the girts $d$ entering recesses cast in the front and rear plates $b$, the whole being firmly bolted together, as shown. This makes a very strong frame, and at the same time it is sufficiently elastic to withstand sudden shocks and jars. The rear plate $b$ is curved inward next the platform, as shown in Fig. 1, to allow room for the rake to deliver the bundle in the path of the machine. Upon this frame, which is suspended from the axle of the driving-wheel B by the hangers $a$, the necessary gearing is located to operate the different parts of the reaper.

The platform C, resting upon two parallel bars, $c$, Fig. 2, is bolted to one side of the frame A, from which it may at any time be easily removed when it is desired to convert the machine into a mower. The head D of the automatic rake is secured to the shaft $x$, Fig. 4, passing through and having bearings in the arms $e$ cast at right angles to the vertical sweep-post F, Figs. 2 and 4. This post is provided with bearings at top and bottom, and its upper end is inclined somewhat toward the rear of the machine. Thereby the rake, as it drops upon the platform, cuts diagonally under the reel close to the guards. This operation, together with the action of the wire or other cloth apron upon the rake D′, already patented by me, divides the cut from the falling grain, leaving the butts of the gavels perfectly square.

The post F and rake D′ are operated by gears $f$ and $g$, shaft $h$, and crank $i$, the eighth arm $j$ being connected to the crank by the universal-jointed link $k$, as fully described in my patent of July 10, 1860. The rear end of the shaft $h$ projects somewhat beyond the gear $g$, and a groove is provided in this projection, into which are fitted pins from the clutch-lever R, which embraces the shaft at this point. This lever is bent, for convenience in operating, somewhat in the form shown in Fig. 2, and is hinged at its lower end to the frame A. By pressing the foot upon this lever the operator throws out the gears $f$ and $g$, whereby the motion of the rake is arrested at any point. When the foot is removed, the gear $g$ is returned by the spring upon the shaft $h$, the latter having a slight end motion in its bearings.

The spiral spring $m$, coiled about the rear arm of the sweep-post F, is secured at one end, either to the brace $l$ or the toe $f'$, while the other passes through a boss, $e'$, upon the arm, and is held by a binding-screw at any desired degree of tension. This spring operates either to assist the rake to pierce through the grain upon the platform, or by altering its tension, it may, by reaction, lighten the blow of the rake when the grain is light. The brace $l$, attached to the rake-head and the shaft $x$, stiffens the rake, and also communicates the power of the spring to it.

The toe $f'$, Figs. 1 and 4, is made fast to the shaft $x$, and when the sweep-post and rake assume the position shown in dotted lines in Fig. 1 the curved edge of the toe comes in contact with a roller, $n$, revolving on an adjustable stud. The continued motion of the gearing thus raises the rake to the position shown in Fig. 2 after the bundle is delivered, at which elevation it is swung back to its former position.

The pawl $o$, pivoted to the arm $e$ of the sweep-post, as shown in dotted lines in Fig. 2, drops into a notch in the periphery of the rake-head, and retains the elevated rake.

When, however, the rake is swung around parallel with the cutter-bar, the projecting toe of the pawl catches upon the plate $o'$, made fast to the frame A, by which the pawl is tripped and the rake allowed to descend upon the grain.

The rake-bar $D''$ is made separate from the head D, being pivoted to the latter at the point $t$, Fig. 2, while the inner end is retained by the cap $t'$, which is wide enough to allow a slight movement of the rake about the point $t$. This allows the rake to accommodate itself to any variation in the relative height of the ends of the platform when passing over uneven ground, which is particularly desirable where a jointed platform is used.

The reel-spindle H, Figs. 1 and 2, rests in boxes upon suitable arms secured to the harvester in any convenient manner. To secure a more perfect action of the reel, I provide at the outer end of one or more of the arms boxes for the reception of bars J. These bars have attached to them a suitable number of fingers, $j'$, for the purpose of picking up fallen grain, and at the inner extremities of the former I provide the fixed arms $s'$, which, as the reel revolves, come in contact with the post $u$, Fig. 2, and cause the fingers $j'$ to assume a vertical position by partially revolving the bars J. The fingers are returned to their former position immediately after the arms $s'$ leave the end of the post $u$ by the springs $s$, secured at one end to the bars J and at the other to the reel-arms, the tension of which revolves the bars till the spur $r$ rests upon the lip $t'$ upon the reel-arm. The fingers thus pick up fallen, lodged, and short grain, convey it to the cutters, and drop it at that point by folding up in the manner shown.

The foregoing will constitute the subject-matter of a future application for a patent.

It will be observed that it is necessary to provide against risk of breaking any portion of the reel when the harvester is backed. I therefore use the ratchet $w$ fast to the reel-spindle, into which the pawl $z$ gears. The pawl is pivoted to the loose sheave N, which is driven from any convenient part of the machine. This ratchet also prevents the reel from dragging cut grain off the platform.

Upon the outside divider P, Figs. 1 and 3, I provide the knife $p'$, properly secured to the divider and extending down to its point. The object of this is to cut apart lodged and tangled grain before it reaches the cutters.

I have shown the knife $p'$ as applied to the extension-divider previously patented by me; but it is equally as efficient when applied to any other divider.

Upon the sweep-post F, I provide a coiled spring, $v$, Fig. 4, secured at one end to the harvester-frame, and at the other made adjustable by a binding-screw upon the sweep-post. This operates to take up any slack in the joints of the link $k$, and causes the rake to always descend in the same place upon the platform.

When it is desired to use an ordinary reel, the fingers $j'$ may be folded down out of the way, being held by the lip $r'$ or other suitable device.

The automatic rake $D'$ may be used with a center or rear located cutter-bar by simply changing the relative position of the gear $g$ and crank $i$ upon the shaft $h$.

The toe $f'$ on the spindle $x$ may be made a continuation of the brace $l$, if desirable.

What I claim as my invention, and desire to secure by Letters Patent, is—

1. The inclined rake-post F, when used in combination with the sweep-rake $D'$, substantially as and for the purposes set forth.

2. The pivoted rake-bar $D''$, in combination with the head D, when the end held by the clasp $t$ is allowed a free vertical movement, as and for the purposes specified.

3. The brace $l$, in combination with the shaft $x$ and rake-head D, for the purposes herein specified.

4. The arrangement of the spring $v$ upon the sweep-post F, operating substantially as set forth.

5. In combination with the folding fingers $j'$ and springs $s$, the vertical post $u$, arranged to operate substantially as described.

6. The spur $r$ upon the bar J, in combination with the lip $r'$ upon the reel-arm, for the purpose of governing the set of the fingers $j'$.

7. The knife $p'$ on the outside divider of a harvester, substantially as shown.

8. The arrangement of the hinged bent lever R, the shaft $h$, and reaction spring and gears $f$ and $g$, for the purposes set forth.

9. The arrangement of the ratchet $w$ and pawl $z$ with the pulley and shaft of a harvester-reel, as and for the purposes specified.

C. R. BRINCKERHOFF.

Witnesses:
F. H. CLEMENT,
WM. S. LOUGHBOROUGH.